United States Patent
Islam et al.

(10) Patent No.: US 8,195,206 B2
(45) Date of Patent: Jun. 5, 2012

(54) METHODS AND APPARATUS FOR PROVIDING CONSISTENCY IN SMS MESSAGE TIMESTAMP FORMATTING FOR MOBILE COMMUNICATION DEVICES

(75) Inventors: M. Khaledul Islam, Kanata (CA); Asif Hossain, Kanata (CA); William Daniel Willey, San Francisco, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 402 days.

(21) Appl. No.: 11/410,171

(22) Filed: Apr. 24, 2006

(65) Prior Publication Data

US 2006/0211434 A1   Sep. 21, 2006

Related U.S. Application Data

(62) Division of application No. 10/734,502, filed on Dec. 12, 2003, now Pat. No. 7,340,264.

(60) Provisional application No. 60/433,459, filed on Dec. 13, 2002.

(51) Int. Cl.
*H04W 4/14* (2009.01)

(52) U.S. Cl. ............... 455/466; 455/412.1; 455/414.1

(58) Field of Classification Search ............ 455/466, 455/412.1, 414.1, 414.4, 418, 419, 422.1, 455/425, 558
See application file for complete search history.

(56) References Cited

U.S. PATENT DOCUMENTS

| | | | |
|---|---|---|---|
| 5,363,377 A | | 11/1994 | Sharpe |
| 5,901,115 A | * | 5/1999 | Katzmann et al. ............ 368/21 |
| 6,016,478 A | | 1/2000 | Zhang et al. |
| 6,144,653 A | | 11/2000 | Persson et al. |

(Continued)

FOREIGN PATENT DOCUMENTS

EP   0 883 314 A2   12/1998

OTHER PUBLICATIONS

3rd Generation Partnership Project 2 "3GPP2": "Short Message Service"SMS" for Wideband Spread Spectrum Systems," 3GPP2, 'Online! No. C.S0015-A, Jan. 11, 2002, XP002305112, Retrieved from the Internet Nov. 11, 2004: URL:http//www.3gpp2.org/public_html/specs/C.S0015-A_v1.0_111403.pdf (109 pgs).

(Continued)

*Primary Examiner* — Kamran Afshar
*Assistant Examiner* — Khawar Iqbal
(74) *Attorney, Agent, or Firm* — John J. Oskorep, Esq.

(57) ABSTRACT

Methods and apparatus for providing consistency in Short Message Service (SMS) timestamp formatting (UTC or non-UTC) for mobile communication devices are disclosed. In one illustrative example, a method involves receiving an SMS message intended for a mobile communication device; identifying whether the SMS message has timestamp data formatted in Coordinated Universal Time (UTC) format or non-UTC format; converting the timestamp data from the UTC format to a non-UTC time format based on an identification that the SMS message has timestamp data formatted in the UTC format; failing to convert the timestamp data to a non-UTC time format based on an identification that the SMS message has timestamp data in the non-UTC format; and causing the SMS message to be sent to the mobile communication device. Other techniques involve mobile device usage of a removable user identity module which has a stored indicator in memory which is indicative of a timestamp mode of operation of a home message center as one of a coordinated universal time (UTC) mode and a non-UTC mode.

23 Claims, 8 Drawing Sheets

U.S. PATENT DOCUMENTS

| | | | |
|---|---|---|---|
| 6,239,719 B1 * | 5/2001 | Hopkins | 340/7.51 |
| 7,206,590 B2 * | 4/2007 | Anson et al. | 455/466 |
| 2002/0098857 A1 | 7/2002 | Ishii | |
| 2004/0043788 A1 | 3/2004 | Mittal | |
| 2004/0092273 A1 * | 5/2004 | Valloppillil | 455/466 |
| 2004/0203620 A1 * | 10/2004 | Thome et al. | 455/412.1 |
| 2004/0203951 A1 * | 10/2004 | Mazzara et al. | 455/466 |
| 2005/0114768 A1 | 5/2005 | Akin et al. | |
| 2009/0310600 A1 * | 12/2009 | Kung et al. | 370/352 |

OTHER PUBLICATIONS

Written Opinion for PCT Application # PCT/CA03/01947, Dec. 20, 2004.
International Preliminary Examination Report for PCT Application # PCT/CA03/01947, Apr. 26, 2005.
PCT Search Report for Application # PCT/CA 03/01947, Nov. 24, 2004.

* cited by examiner

| Field | Length (bits) |
|---|---|
| SUBPARAMETER_ID | 8 |
| SUBPARAM_LEN | 8 |
| YEAR | 8 |
| MONTH | 8 |
| DAY | 8 |
| HOURS | 8 |
| MINUTES | 8 |
| SECONDS | 8 |
| OFFSET_SIGN | 1 |
| UTC_TIME_OFFSET | 6 |
| RESERVED | 1 |
| Note: all date and time fields contain two 4-bit BCD numbers giving the decimal value of the field. For example, if the year is 1996, the YEAR field contains '10010110'. | |

METHODS AND APPARATUS FOR PROVIDING CONSISTENCY IN SMS MESSAGE TIMESTAMP FORMATTING FOR MOBILE COMMUNICATION DEVICES

CROSS-REFERENCE TO RELATED APPLICATION

This application is a divisional application of and claims priority to U.S. non-provisional patent application having Ser. No. 10/734,502 and a filing date of 12 Dec. 2003, now U.S. Pat. No. 7,340,264 which claims priority to a U.S. Provisional Application entitled "Apparatus And Method Of SMS Message Center Time Stamp Disambiguation", Serial No. 60/433,459 filed on Dec. 13, 2002, which is hereby incorporated by reference herein.

BACKGROUND

1. Technical Field

This application generally relates to wireless communications, and more particularly to Short Message Service (SMS) messaging and timestamp data associated therewith.

2. Description of the Related Art

Short Messaging Service (SMS) is used to send short messages (i.e. SMS messages) from one mobile station (MS) to another MS, as well as from an External Short Message Entity (ESME) to an MS. An originating MS can use SMS to send an SMS message to a terminating MS that has service from the same or different service provider as the originating MS. SMS messaging protocols may adhere to industry standards, such as the $3^{rd}$ Generation Partnership Project 2 (3GPP2) specification C.S0015-A. When an originating MS sends an SMS message to another MS, it sends an SMS Teleservice Layer Submit message. When an SMS message is sent from an ESME to an MS, the ESME forwards the SMS message to a Message Center (MC) using a Short Messaging Peer-to-Peer (SMPP) Protocol. The MC of the originating MS processes the SMS submit message. Upon receiving the SMS submit message, the MC of the originating MS creates an SMS Teleservice Layer Deliver message to be sent to the terminating MS. The SMS Teleservice Layer Deliver message includes a Message Center Time Stamp. The Message Center Time Stamp is used by the terminating MS to display the time that the message was sent by the originator.

Some problems exist with implementations of SMS in IS-41-based systems. MCs do not all use the same format for the Message Center Time Stamp subparameter. MCs of some service providers always set the Message Center Time Stamp to Coordinated Universal Time (UTC) time (or Greenwich Mean Time or GMT), regardless of the current or home time zone of the MS. Other service providers set the Message Center Time Stamp to a time that represents the time in the home time zone of the originating MS. An MS can typically be programmed to operate with a given service provider, and typically includes a field in non-volatile memory that indicates if the home MC uses UTC time or home time. An MS uses this field in addition to the Message Center Time Stamp to determine how to appropriately display the time.

If an originating MS associated with an MC using UTC time sends an SMS message to a terminating MS associated with an MC using home time, the terminating MS will not be able to correctly display the time. Likewise, if an originating MS associated with an MC using home time sends an SMS message to a terminating MS associated with an MC using UTC time, the terminating MS will not be able to correctly display the time. Similarly, if an originating MS associated with an MC using home time of a first time zone sends an SMS message to a terminating MS associated with an MC using home time of a different time zone, the terminating MS will not be able to correctly display the time.

If all MSs and MCs could be converted at once using a common and consistent time reference (e.g. UTC time), such problems would be solved. It is not efficient nor practical, however, to simultaneously upgrade the software of millions of previously-deployed MSs. It is also not efficient or practical to simultaneously upgrade the software of all MCs in the network.

Thus, what are needed are methods and apparatus for converting SMS message time stamp information so that terminating mobile stations will always display the correct time. Such techniques need to be introduced in such a way to provide for backwards-compatibility. In conventional systems, the time stamp information is correctly displayed in many instances. For example, when an MS associated with an MC using home time sends an SMS message to another MS associated with an MC using home time in the same time zone, the time stamp information is correctly displayed. With a backwards-compatible solution, appropriate operation occurs when both a prior version MS operates with an upgraded MC and a newer version MS operates with an MC that has not been upgraded.

Cdma2000 also supports a Removable User Identity Module (R-UIM), as described in standard 3GPP2 C.S0023-0 version 4.0. An R-UIM includes a microprocessor and non-volatile memory. The R-UIM stores certain information associated with a user in order to allow a user to easily switch between different Mobile Equipment (ME), and can also be used to store SMS messages. Since it is unaware of the type of time format used by the subscriber's home MC, an ME cannot properly determine how to display the time of the SMS message. Thus, it is further desirable to provide methods and apparatus for consistent SMS message time stamp formatting so that the time of SMS messages stored on an R-UIM can be appropriately displayed when the R-UIM is inserted into different MEs.

SUMMARY

Methods and apparatus for providing consistency in Short Message Service (SMS) timestamp formatting to disambiguate between displayed timestamps (UTC or non-UTC) are disclosed. In one illustrative example, a method involves receiving an SMS message intended for a mobile communication device; identifying whether the SMS message has timestamp data formatted in Coordinated Universal Time (UTC) format or non-UTC format; converting the timestamp data from the UTC format to a non-UTC time format based on an identification that the SMS message has timestamp data formatted in the UTC format; failing to convert the timestamp data to a non-UTC time format based on an identification that the SMS message has timestamp data in the non-UTC format; and causing the SMS message to be sent to the mobile communication device. Other techniques involve mobile device usage of a removable user identity module which has a stored indicator in memory which is indicative of a timestamp mode of operation of a home message center as one of a coordinated universal time (UTC) mode and a non-UTC mode.

BRIEF DESCRIPTION OF THE DRAWINGS

Embodiments of the present application will now be described, by way of example only, with reference to the attached figures, wherein the same reference numerals are used in different figures to denote similar elements.

DETAILED DESCRIPTION OF THE PREFERRED EMBODIMENTS

Figure 1:
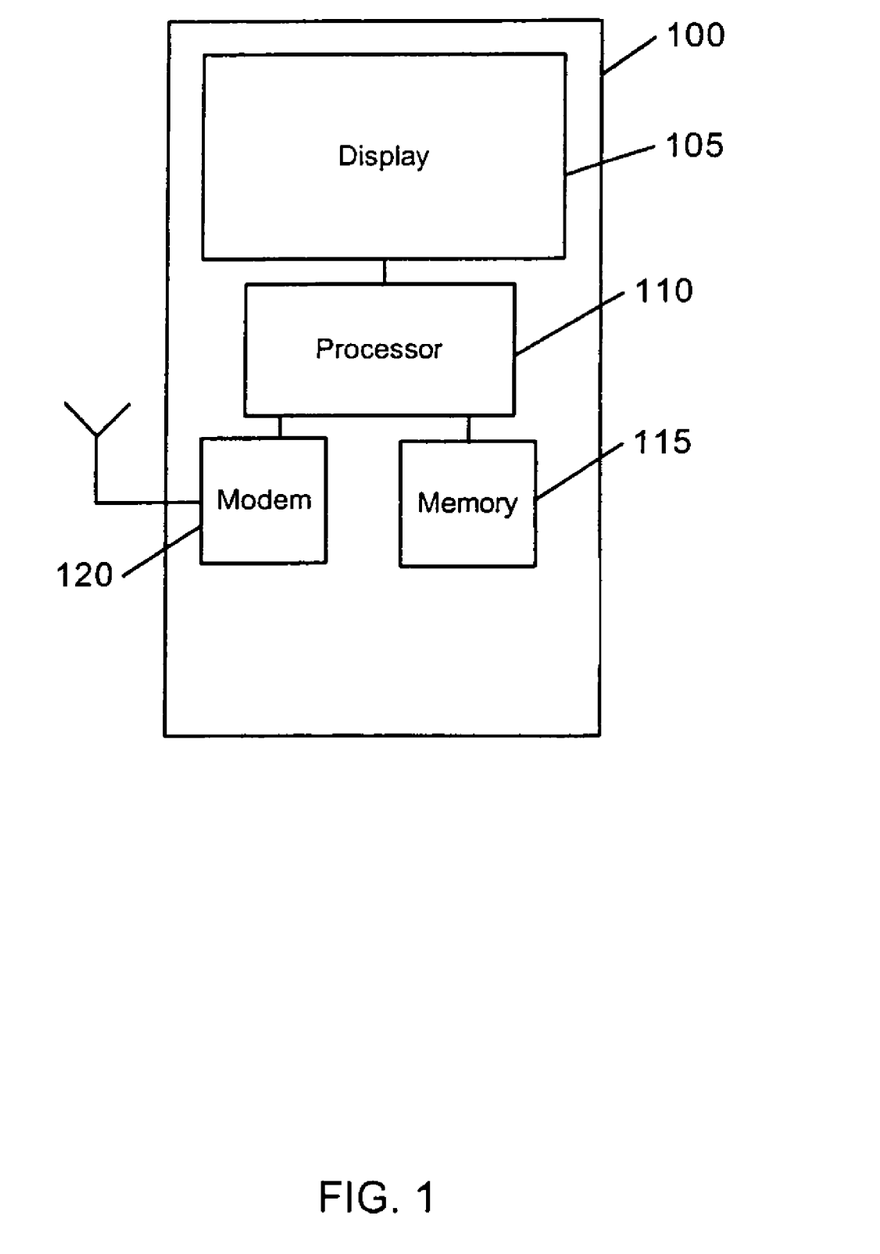
FIG. 1 is a block diagram of a first exemplary cdma2000 mobile station (MS)
Figure 2:
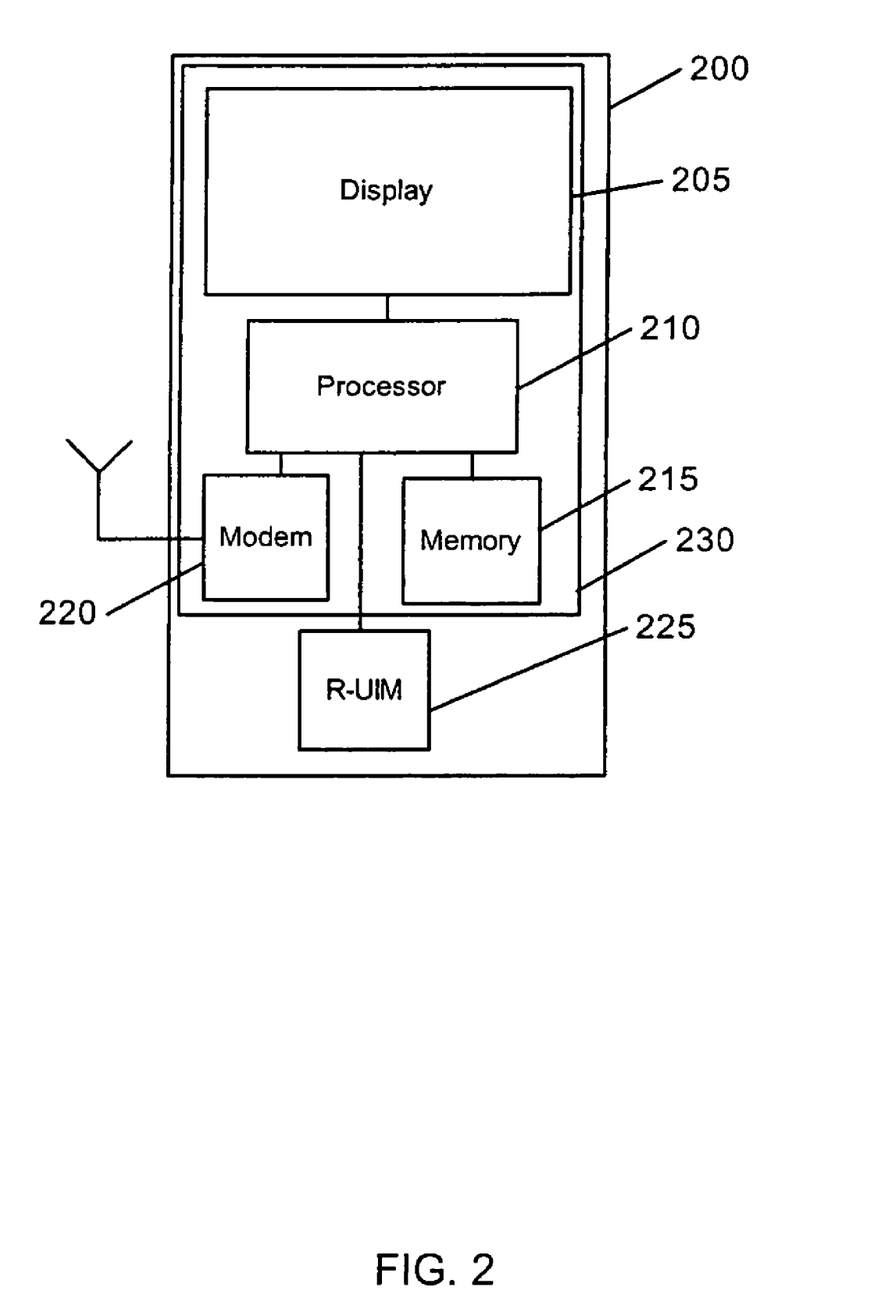
FIG. 2 is a block diagram of a second exemplary cdma2000 MS.

Turning now to FIG. 1, a block diagram of a first exemplary cdma2000 mobile station (MS) 100 is shown. MS 160 includes a microprocessor 110 and a display 105 (such as an LCD), a radio modem 120, and memory 115 (which includes non-volatile memory) which are coupled to microprocessor 110. FIG. 2 is a block diagram of a second exemplary cdma2000 MS 200. MS 200 includes a microprocessor 210 and a display 205 (such as an LCD), a radio modem 220, and memory 215 (which includes non-volatile memory) which are coupled to microprocessor 210. Display 205, radio modem 220, and memory 215 are coupled to microprocessor 210. MS 260 also includes a Removable User Identity Module (R-UIM) 225 which is coupled to MS 200 via an R-UIM interface of MS 200. R-UIM 225 may be detached from MS 200 and inserted into another MS. MS 200 and R-UIM 225 are configured and adapted to function as described in standard document 3GPP2 C.S0023-0 version 4.0, "Removable User Identity Module for Spread Spectrum Systems". According to C.S0023-0 version 4.0, an MS is comprised of a Mobile Equipment (ME) and an R-UIM. Block 230 shows the ME portion of MS 200, which includes display 205, microprocessor 210, memory 215, and radio modem 220.

Figure 3:
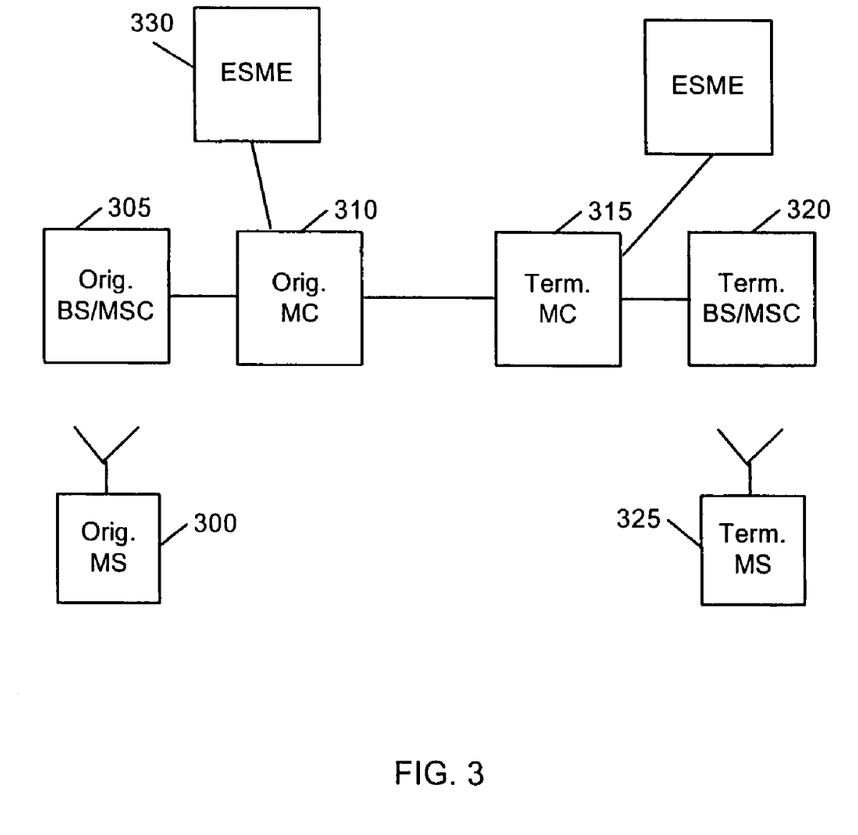
FIG. 3 shows an exemplary system for sending an SMS message from one MS to another MS, or from an External Short Message Entity (EMSE) to an MS.

FIG. 3 shows an exemplary system for sending an SMS message from one MS to another MS, or from an External Short Message Entity (EMSE) to an MS. Over-the-air communication between BS/MSCs and MSs can use cdma2000 air interface specifications such as C.S0001-0 v3.0, C.S0002-0 v3.0, C.S0003-0 v3.0, C.S0004-0 v3.0, and C.S0005-0 v3.0. Communication between BS/MSCs and MCs and EMSEs and MCs can use network specifications such as N.S0005.

In FIG. 3, originating MS 300 or ESME 330 sends an SMS Submit message to originating BS/MSC 305. Originating BS/MSC 305 forwards the SMS Submit message to originating MC 310. Originating MC 310 then creates a Deliver message based upon the content of the SMS Submit message. Originating MC 310 then forwards the Deliver message to Terminating MC 315. Terminating MC 315 then forwards the SMS Deliver message to terminating BS/MSC 320. Terminating BS/MSC 320 then forwards the SMS Deliver message to terminating MS 325.

When Originating MC 310 creates the SMS Deliver message it adds a Message Center Time Stamp subparameter to the SMS Deliver message. If MC 310 uses Coordinated Universal Time (UTC) format for the Message Center Time Stamp, it sets a time modifier to indicate that UTC is used. For example, the OFFSET_SIGN and UTC_TIME_OFFSET fields (see FIG. 4) may be set to zero. If MC 310 uses non-UTC time format for the Message Center Time Stamp, it sets the time modifier field based upon the message center time in order to allow the message recipient to determine the UTC time based upon the modifier.

Figure 4:
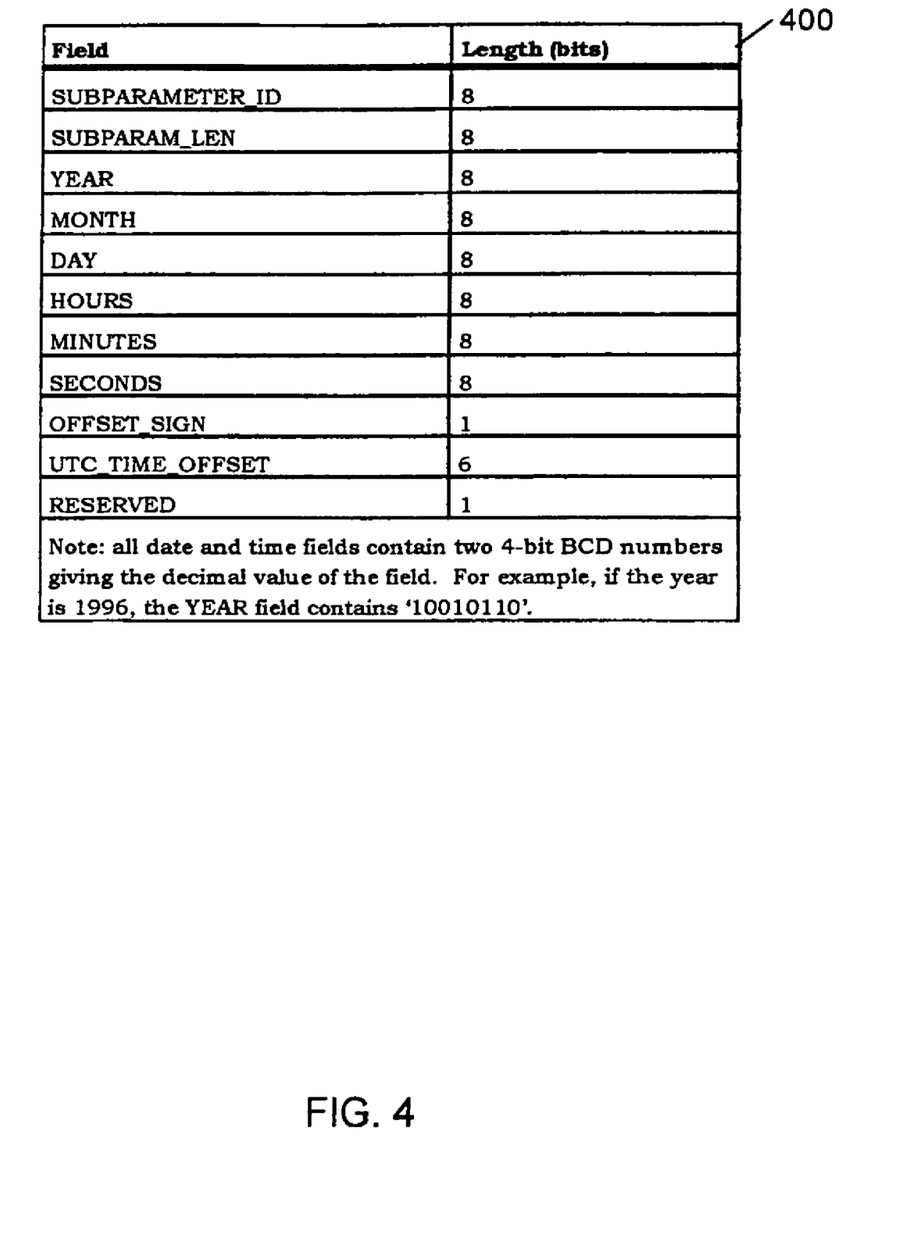
FIG. 4 is an illustration of the format of an enhanced timestamp subparameter of an SMS message.

The MC may use information such as that in Table 1 below to determine how to set the OFFSET_SIGN and UTC_TIME_OFFSET fields, which are shown in FIG. 4. The MC looks up the message center time zone in the first column and finds the corresponding entry in the third column. If the corresponding entry in the third column is negative, the MC sets OFFSET_SIGN to '1'. If the corresponding entry in the third column is positive, the MC sets OFFSET_SIGN to '0'. The MC sets UTC_TIME_OFFSET to four times (4×) the absolute value of the corresponding entry in the third column.

TABLE 1

Conversion Data.

| LOCAL TIME ZONE | CONVERSION FROM UTC TO LOCAL TIME | CONVERSION FROM LOCAL TIME TO UTC | TIME AT 12:00 UTC |
|---|---|---|---|
| SE Greenland | −1 hour | +1 hour | 11 AM |
| Atlantic Ocean | −2 hours | +2 hours | 10 AM |
| Greenland | −3 hours | +3 hours | 9 AM |
| Newfoundland | −3.5 hours | +3.5 hours | 8:30 AM |
| Atlantic Standard | −4 hours | +4 hours | 8 AM |
| Eastern Standard | −5 hours | +5 hours | 7 AM |
| Central Standard | −6 hours | +6 hours | 6 AM |
| Mountain Standard | −7 hours | +7 hours | 5 AM |
| Pacific Standard | −8 hours | +8 hours | 4 AM |
| Alaskan Standard | −9 hours | +9 hours | 3 AM |
| Hawaiian Standard | −10 hours | +10 hours | 2 AM |
| Nome, Alaska | −11 hours | +11 hours | 1 AM |
| Central European | +1 hour | −1 hour | 1 PM |
| Eastern European | +2 hours | −2 hours | 2 PM |
| Moscow | +3 hours | −3 hours | 3 PM |
| Iran | +3.5 hours | −3.5 hours | 3:30 PM |
| NW Caspian Sea | +4 hours | −4 hours | 4 PM |
| Afghanistan | +4.5 hours | −4.5 hours | 4:30 PM |
| Ural Mountains, Russia | +5 hours | −5 hours | 5 PM |
| India | +5.5 hours | −5.5 hours | 5:30 PM |
| Almaty, Russia | +6 hours | −6 hours | 6 PM |
| Burma | +6.5 hours | −6.5 hours | 6:30 PM |
| W Mongolia | +7 hours | −7 hours | 7 PM |
| China | +8 hours | −8 hours | 8 PM |
| Japan | +9 hours | −9 hours | 9 PM |
| Mid Australia | +9.5 hours | −9.5 hours | 9:30 PM |
| Eastern Russia/Sydney | +10 hours | −10 hours | 10 PM |
| Kamchatskiy, E Russia | +11 hours | −11 hours | 11 PM |

FIG. 4 is an illustration of the format of an enhanced time subparameter. The time is contained in the DAY, HOURS, MINUTES, and SECONDS fields. The time may be in either a UTC time format or a non-UTC time format. The enhanced time subparameter also includes the OFFSET_SIGN and UTC_TIME_OFFSET fields, which serve as a time modifier. The recipient of the subparameter can use the time modifier to determine if the time is a UTC time or a non-UTC time. The OFFSET_SIGN and UTC_TIME_OFFSET fields are both equal to zero if the time is a UTC time. The time modifier also gives an offset that for non-UTC times allows the recipient to determine the UTC time from the non-UTC time.

Figure 5:
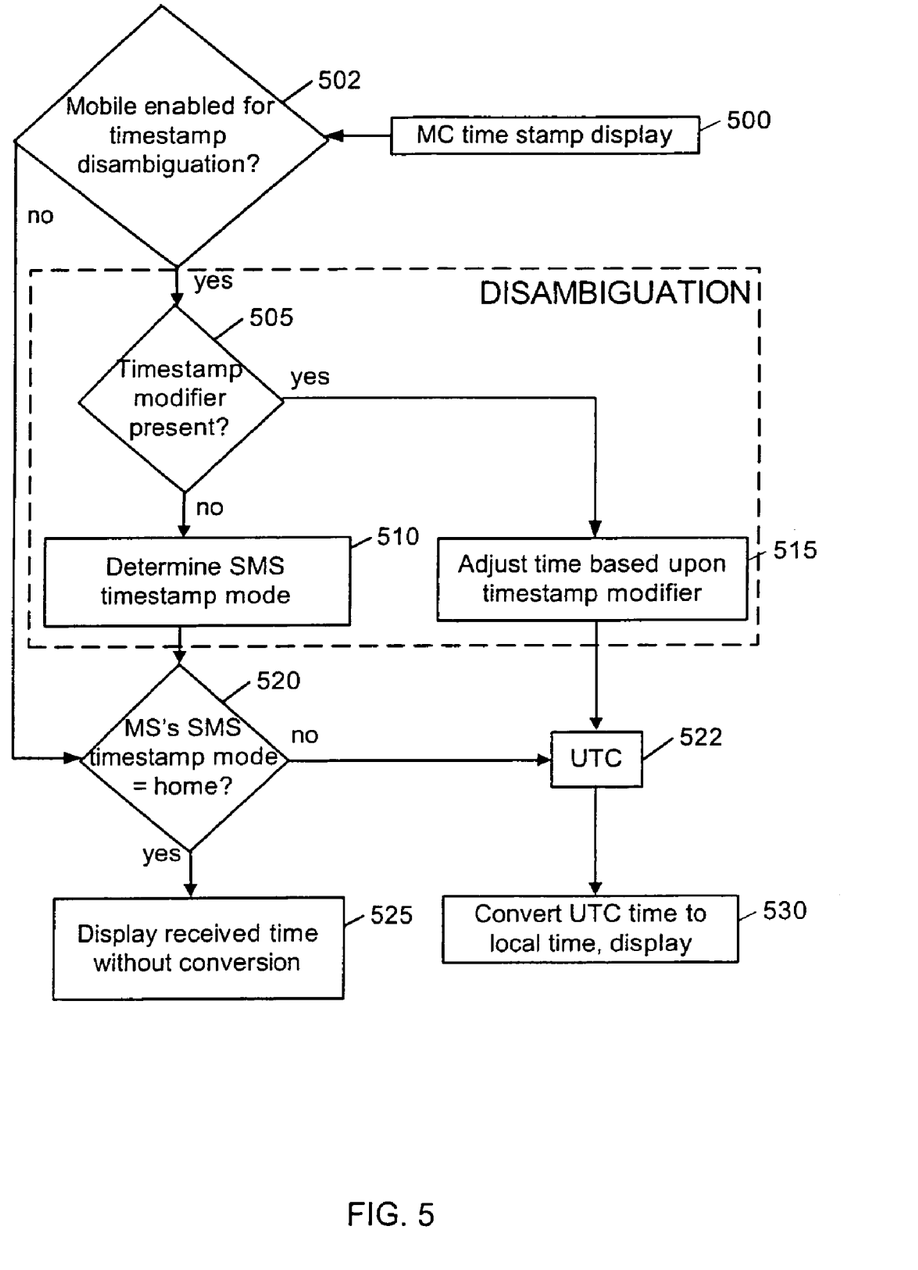
FIG. 5 is a flowchart for describing a method of providing consistency in SMS message time stamp formatting ("time stamp disambiguation") for mobile communication devices.

FIG. 5 is a flowchart for describing a method of providing consistency in SMS message time stamp formatting ("time stamp disambiguation") for mobile communication devices. Beginning at a step 500, an MS receives an SMS message which originated from another MS or an EMSE. The message may be an SMS Teleservice layer message in accordance with 3GPP2 C.S0015-A. For example, the message may be an SMS Deliver Message, an SMS Delivery Acknowledgment Message, or an SMS Read Acknowledgment message. The message includes a Message Center Time Stamp which indicates the time at which the SMS message was delivered. The message also includes a time stamp modifier. This time stamp modifier could be an extension of the Message Center Time Stamp, such as the OFFSET_SIGN and UTC_TIME_OFFSET fields shown and described in relation to FIG. 4. The time stamp modifier could also be included as a new subparameter in the SMS Teleservice layer message. Once received, this SMS Teleservice Layer message may be stored either in memory of the MS or its associated R-UIM.

At step 502 of FIG. 5, an MS that is enabled for time stamp disambiguation will pursue step 505, whereas one that is not so enabled will jump to step 520 and ignore the additional fields. At step 505, the MS checks the SMS Teleservice layer message to determine if the time stamp modifier is present. If the time stamp modifier is included in the Message Center Time Stamp, the MS can determine its presence based upon the length of the subparameter (e.g. if SUBPARAM_LEN is equal to 6 the time stamp modifier is not present, but if SUBPARAM_LEN is equal to 7 the time stamp modifier is present). If the time stamp modifier is included in an MC time stamp subparameter, the MS can determine its presence based upon the inclusion of the new appended fields in the subparameter. If the time stamp modifier is present, the MS proceeds to step 515.

At step 515 of FIG. 5, the MS adjusts the time in the message based upon the time stamp modifier. If the time stamp modifier field indicates that the time is in UTC format (i.e. OFFSET_SIGN and UTC TIME_OFFSET fields are both equal to zero), no adjustment is needed. Otherwise, the MS adjusts the time based upon the time stamp modifier field. The MS adjusts the non-UTC time in the DAY, HOURS, MINUTES, and SECONDS fields to UTC time format. In particular, the MS checks the OFFSET_SIGN field. If OFFSET_SIGN is equal to '1', the MS subtracts the number of quarter hours represented by UTC_TIME_OFFSET from the non-UTC time to determine the UTC time. If OFFSET_SIGN is equal to '0', the MS adds the number of quarter hours represented by UTC_TIME_OFFSET to the non-UTC time to determine the UTC time. As a result of step 515, the time stamp is in UTC format (step 522) and processing continues at step 530.

At step 530, the MS converts UTC time to local time and displays it to the user. The MS will know the local time zone (i.e. the time zone where the MS currently is) based upon a setting in its memory. The MS can also use the local time offset provided in the Sync Channel Message as an alternative. The MS converts the UTC time to the local time based upon this setting. The MS may perform a table lookup to perform this operation; a table such as Table 1 may be used. If the MS's local time zone is Eastern Standard Time (EST), for example, the MS converts UTC time to EST time by subtracting five hours from UTC time. After converting to local time, the MS displays the newly formatted time.

If the time stamp modifier is not present as tested in previous step 505, at step 510 the MS determines the SMS time stamp "mode" to use for the message which does not include a time stamp modifier. If the MS does not include an R-UIM, the MS checks the value of a field in non-volatile memory to determine if the time stamp mode is UTC or home time zone mode; one value of the field (e.g. 0) represents UTC mode and another value of the field (e.g. 1) represents home time zone mode. If the MS does include an R-UIM, the MS determines the time stamp mode from the R-UIM. The MS may determine this based upon the value of a new field in the non-volatile memory of the R-UIM. Alternatively, the MS could have a table that maps service provider names to time stamp modes. In this case, the MS may retrieve the service provider name from the R-UIM and then determine the time stamp mode based upon the service provider name. Continuing at step 520, the MS checks to see if the time stamp mode is the home time stamp mode. If the result of the decision in step 520 is that the SMS time stamp mode is not home time stamp mode, then the time will be processed as UTC time (step 522) and the MS proceeds to step 530 previously discussed.

If the result of the decision in previous step 520 is that the SMS time stamp mode is the home time stamp mode, then the time stamp will be processed as a home time stamp where the MS proceeds to step 525. At step 525, the MS converts home time to local time and displays it to the user. The MS will know the local time zone (i.e. the time zone where the MS is currently operating) based upon a setting in its memory. An MS without an R-UIM determines its home time zone based upon a memory setting in its own memory. This could be either a variable that directly maps to the home time zone or based upon some other information. For example, the home time zone could be determined based upon a table lookup of the phone's home area code (for example, 415=Pacific Standard Time (PST), 847=Central Standard Time (CST), 404=Eastern Standard Time (EST)). Alternatively, the home time zone could be determined based upon a table lookup of the MS's home SID and or NID. If the MS has an R-UIM the MS determines its home time zone based upon a setting in the R-UIM. This could also be either a variable from the R-UIM that directly maps to the home time zone or based upon some other information from the R-UIM such as the subscriber's home area code or the subscriber's home SID and or NID. The MS will know the local time zone (i.e. the time zone where the MS is currently operating) based upon a setting in its memory.

In order to convert the home time to the local time, the MS can use a conversion table such as Table 1 above. The MS can convert the home time to local time by looking up the home time zone in the first column, adding the associated offset in the third column to the home time, then adding the offset in the second column that is associated with the local time zone. After converting to local time, the MS displays the time. When the MS converts a time to a local time, it also applies an offset for daylight savings time for times of the year when daylight savings time is observed.

Figure 6:
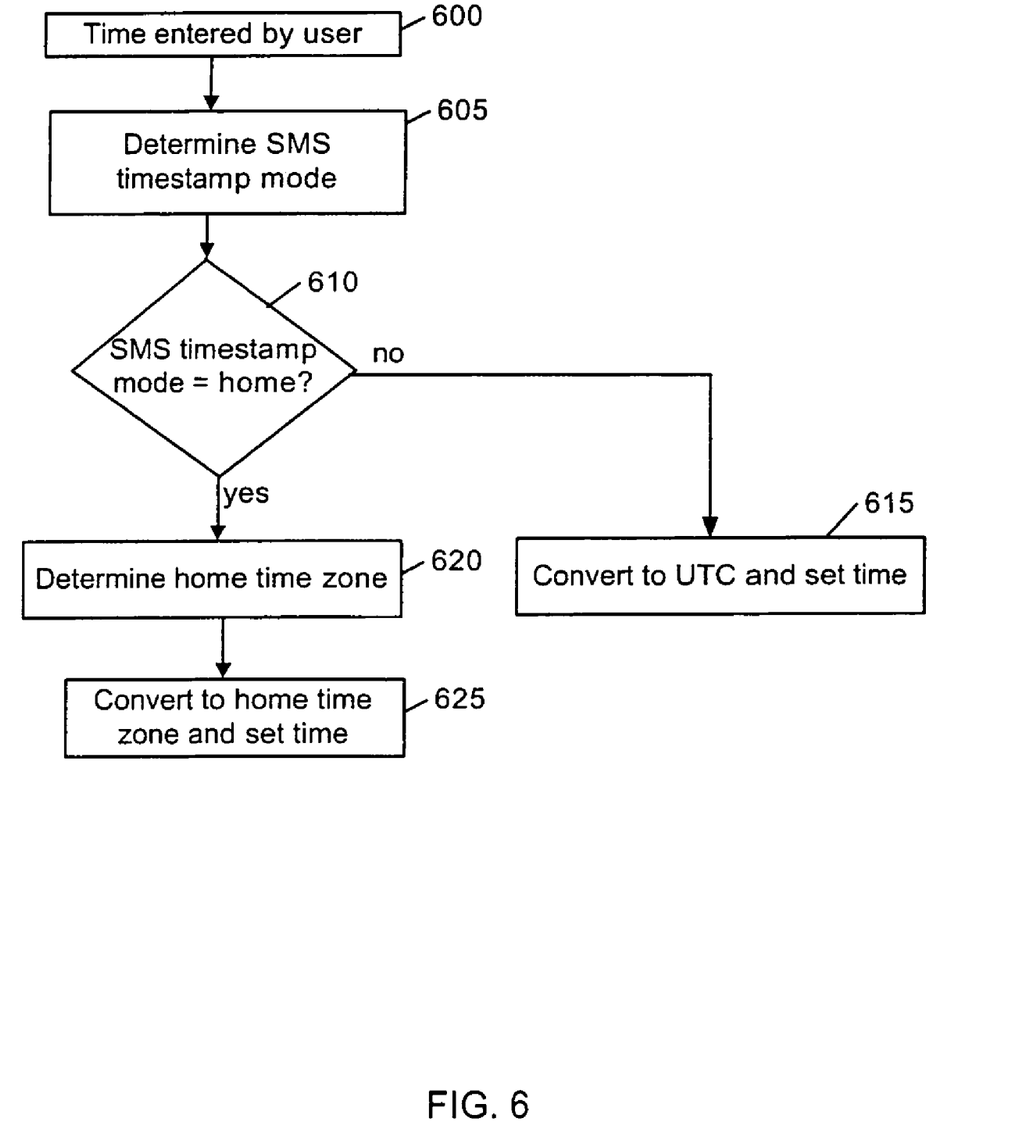
FIG. 6 shows a flowchart which describes a method of setting a time in an SMS message by an MS.

FIG. 6 shows a flowchart which describes a method of setting a time in an SMS message by an MS. This procedure can be used, for example, when setting the Validity Period—Absolute Subparameter or the Deferred Delivery Time Absolute Subparameter, both defined in 3GPP2 C.S0015-A. Both Subparameters are enhanced by the addition of the time modifier fields in FIG. 4. The process begins at step 600, where the user enters the time at the MS. Processing continues at step 605 where the MS identifies the SMS time stamp mode to use for the subparameter. If the MS does not include an R-UIM, the MS identifies the value of a field in non-volatile memory to determine if the time stamp mode is UTC or home time zone mode; one value of the field (e.g. '0') represents UTC mode and another value of the field (e.g. '1') represents home time zone mode. If the MS does include an R-UIM, the MS identifies the time stamp mode from the R-UIM. The MS may determine this based upon the value of a new field in the non-volatile memory of the R-UIM. Alternatively, the MS may have a table that maps service provider names to time stamp modes. In this case, the MS could retrieve the service provider name from the R-UIM and then determine the time stamp mode based upon the service provider name.

After identifying the time stamp mode in step 605, processing continues at decision step 610 where the MS identifies whether the time stamp mode is the home time stamp mode. If the result of decision step 615 is that the SMS time stamp mode is not home time stamp mode, then the time in the subparameter will be set as UTC time and the MS proceeds to step 615. If the result of decision step 615 is that the SMS time stamp mode is the home time stamp mode, then the time in the subparameter will be set as a home time stamp and the MS proceeds to step 620.

In step 615, the MS converts the time entered by the user to UTC and sets the time in the DAY, HOURS, MINUTES, and SECONDS fields of the subparameter. The MS includes the time modifier fields in the subparameter and sets OFFSET_SIGN and UTC_TIME_OFFSET both to zero to indicate that the time is a UTC time. Processing then ends. At step 620, the MS determines its home time zone. An MS without an R-UIM determines its home time zone based upon a memory setting in its own memory. This could be either a variable that directly maps to the home time zone or based upon some other information. For example, the home time zone could be determined based upon a table lookup of the phone's home area code (for example, 415=Pacific Standard Time or PST, 847=Central Standard Time or CST, 404=Eastern Standard Time or EST). Alternatively, the home time zone could be determined based upon a table lookup of the MS's home SID and or NID. If the MS has an R-UIM, it determines its home time zone based upon a setting in the R-UIM. This may also be either a variable from the R-UIM that directly maps to the home time zone or based upon some other information from the R-UIM such as the subscriber's home area code or the subscriber's home SID and or NID. After determining the home time zone at step 620, processing continues at step 625.

At step 625, the MS converts the time entered by the user to the time in the user's home time zone and sets the time in the DAY, HOURS, MINUTES, and SECONDS fields of the subparameter to the time in the user's home time zone. The MS sets the time modifier field in the subparameter based upon the home time zone in order to allow the message recipient to determine the UTC time based upon the modifier. The MS may use Table 1 to determine how to set the OFFSET_SIGN and UTC_TIME_OFFSET fields shown in FIG. 4. The MS looks up the home time zone in the first column and finds the corresponding entry in the third column. If the corresponding entry in the third column is negative, the MS sets OFFSET_SIGN to '1'. If the corresponding entry in the third column is positive, the MS sets OFFSET_SIGN to '0'. The MS sets UTC_TIME_OFFSET to four times the absolute value of the corresponding entry in the third column. Processing ends after step 625.

An upgraded Message Center will have knowledge of the current UTC time and thus, when it receives subparameters created by MSs as described in relation to FIG. 6, it will be able to convert the time in the subparameters to UTC time and process it accordingly.

The previously described solution adds a time modifier field (one byte) to an SMS message, thus reducing the amount of user information that can be sent in the message by one byte. However, techniques that do not add a time modifier field may be utilized as an alternative.

Figure 7:
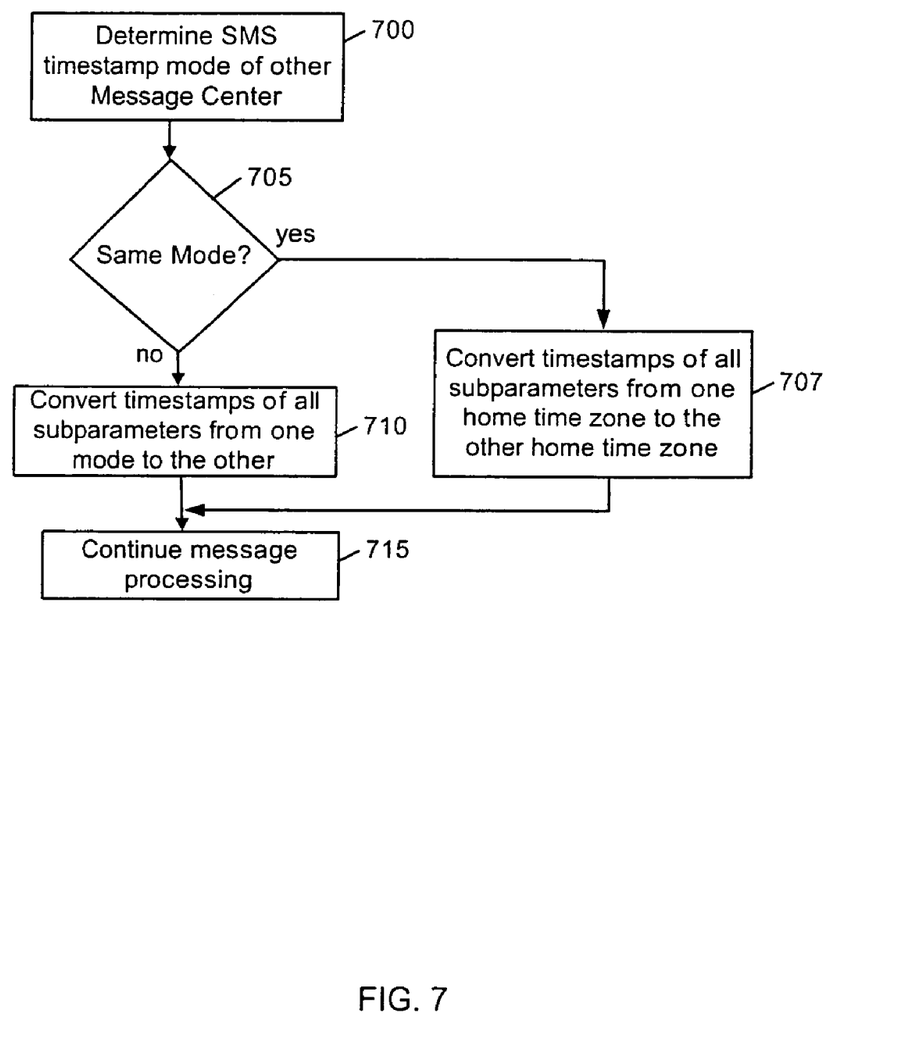
FIG. 7 is a flowchart of a method which may be used by a Message Center (MC) to convert time stamps in SMS. Teleservice Layer subparameters from one time stamp format to another time stamp format.

FIG. 7 is a flowchart of a method which may be used by a Message Center (MC) to convert time stamps in SMS Teleservice Layer subparameters from one time stamp format to another time stamp format. This procedure is performed only by MCs that operate in a non-UTC time stamp mode. The procedure is used for pre-processing messages received from other MCs immediately after reception and before performing the existing message processing. The procedure is also used for post-processing messages to be sent to other MCs immediately before transmission and after the existing message processing is performed.

At step 700 of FIG. 7, the procedure begins. In step 700 the MC determines the SMS time stamp mode of the other MC. This may be determined for received messages by examining the address from which the message was received, or for transmitted messages by examining the address to which the message is to be transmitted. It is contemplated that other ways of determining the time stamp mode of the other MC are possible. The time stamp mode (UTC or non-UTC) is then fetched based upon a table lookup of the address. After the MC determines the time stamp mode of the other MC, processing continues at decision step 705.

At decision step 705, the MC identifies whether the other MC uses the same time stamp mode. If the other MC uses the same mode, then processing continues at step 707. If the other MC uses a different time stamp mode, then processing continues at step 710. At step 707, the MC translates all of the time stamps in the Teleservice Layer message from the home time zone of one MC to the home time zone of the other MC if the two MCs use different home time zones. For messages to be transmitted, the MC translates the time stamps from its own home time zone to the other MC's home time zone; the time stamps in messages to be transmitted are modified before the messages are transmitted. For received messages, the MC translates the time stamps from the other MC's home time zone to its own home time zone; received messages are modified to use the converted time stamps before further processing. The home time zones of the MCs may be determined, for example, based upon the area codes of the phone numbers of the MSs to which and from which messages are addressed; it is contemplated that other methods of determining the home time zones of the MCs are possible. After completion of step 707, processing continues at step 715.

At step 710 the MC translates all of the time stamps in the Teleservice Layer message from one format to the other format. For received messages, the MC translates the time stamps from UTC format to non-UTC format using the home time zone. The received messages are modified to use the converted time stamps before further processing. For messages to be transmitted, the MC translates the time stamps from non-UTC format using the home time zone to UTC format. The messages to be transmitted are modified to use the converted time stamps before being transmitted.

Processing then continues at step 715 where messages to be transmitted are transmitted, or where processing on received messages continues. In order for MSs having R-UIMs to properly display messages whose time stamps have been translated according to the procedure shown in FIG. 7, it is important that the MS be able to determine the time stamp mode (UTC or non-UTC) based upon information in the R-UIM and also to be able to determine the home time zone for non-UTC operation. The procedure in FIG. 5 can be used to properly display messages in this scenario, though it should be noted that the result of decision step 505 would always be negative and thus step 515 would not be used since the time modifier would not be present. Likewise, in order for MSs having R-UIMs to properly transmit messages whose time stamps are to be translated according to the procedure shown in FIG. 7, it is important that the MS be able to determine the time stamp mode (UTC or non-UTC) based upon information in the R-UIM and also to be able to determine the home time zone for non-UTC operation. The procedure in FIG. 6 can be used to properly transmit messages in this scenario with slight modification. The modification to FIG. 6 is that the time modifier is not added to the message.

Figure 8:
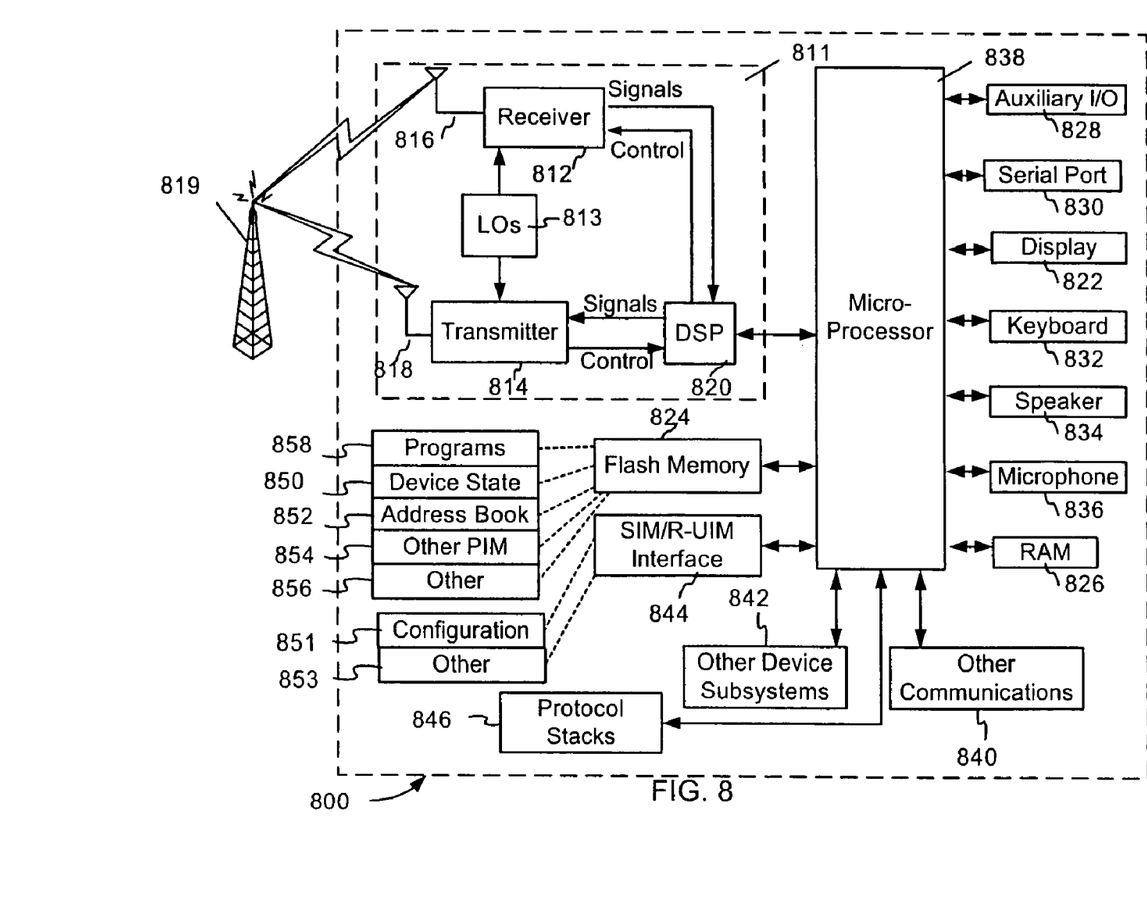
FIG. 8 is a more detailed schematic block diagram of a mobile station (MS) which may be utilize and/or incorporate the techniques of the present application.

FIG. 8 is a more detailed schematic block diagram of an exemplary MS which may be utilized in connection with techniques of the present application. MS 800 is preferably a two-way wireless communication device having at least voice and data communication capabilities. MS 800 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where MS 800 is enabled for two-way communication, it will incorporate a communication subsystem 811, including both a receiver 812 and a transmitter 814, as well as associated components such as one or more, preferably embedded or internal, antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate. For example, MS 800 may include a communication subsystem 811 designed to operate within the cdma2000™ network.

Network access requirements will also vary depending upon the type of network 819. A GPRS MS requires a Subscriber Identity Module (SIM) card in order to operate on a GPRS network. A CDMA MS requires a Removable User Identity Module (R-UIM) or configurable non-volatile memory in order to operate on CDMA as well as other access networks in case of hybrid mode operation.

When required network registration or activation procedures have been completed, MS 800 may send and receive communication signals over the network 819. Signals received by antenna 816 through communication network 819 are input to receiver 812, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 819 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

MS 800 preferably includes a microprocessor 838 which controls the overall operation of the device. Communication functions, including at least data and voice communications, are performed through communication subsystem 811. Microprocessor 838 also interacts with further device subsystems such as the display 822, flash memory 824, random access memory (RAM) 826, auxiliary input/output (I/O) subsystems 828, serial port 830, keyboard 832, speaker 834, microphone 836, a short-range communications subsystem 840 and any other device subsystems generally designated as 842.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the microprocessor 838 is preferably stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Microprocessor 838, in addition to its operating system functions, preferably enables execution of software applications on the MS. A predetermined set of applications that control basic operations, including at least data and voice communication applications for example, will normally be installed on MS 800 during manufacturing. A preferred software application may be a personal information manager (PIM) application having the ability to organize and manage data items relating to the user of the MS such as, but not limited to, e-mail, calendar events, voice mails, appointments, and task items. Naturally, one or more memory stores would be available on the MS to facilitate storage of PIM data items. Such PIM application would preferably have the ability to send and receive data items, via the wireless network 819. In a preferred embodiment, the PIM data items are seamlessly integrated, synchronized and updated, via the wireless network 819, with the MS user's corresponding data items stored or associated with a host computer system. Further applications may also be loaded onto the MS 800 through the network 819, an auxiliary I/O subsystem 828, serial port 830, short-range communications subsystem 840 or any other suitable subsystem 842, and installed by a user in the RAM 826 or preferably a non-volatile store (not shown) for execution by the microprocessor 838. Such flexibility in application installation increases the functionality of the device and may provide enhanced on-device functions, communication-related functions, or both. For example, secure communication applications may enable electronic commerce functions and other such financial transactions to be performed using the MS 800.

In a data communication mode, a received signal such as a text message or web page download will be processed by the communication subsystem 811 and input to the microprocessor 838, which preferably further processes the received signal for output to the display 822, or alternatively to an auxiliary I/O device 828. A user of MS 800 may also compose data items such as email messages for example, using the keyboard 832, which is preferably a complete alphanumeric keyboard or telephone-type keypad, in conjunction with the display 822 and possibly an auxiliary I/O device 828. Such composed items may then be transmitted over a communication network through the communication subsystem 811.

For voice communications, overall operation of MS 800 is similar, except that received signals would preferably be output to a speaker 834 and signals for transmission would be generated by a microphone 836. Alternative voice or audio I/O subsystems, such as a voice message recording subsystem, may also be implemented on MS 800. Although voice or audio signal output is preferably accomplished primarily through the speaker 834, display 822 may also be used to provide an indication of the identity of a calling party, the duration of a voice call, or other voice call related information for example.

Serial port 830 in FIG. 8, would normally be implemented in a personal digital assistant (PDA)-type MS for which synchronization with a user's desktop computer (not shown) may be desirable, but is an optional device component. Such a port 830 would enable a user to set preferences through an external device or software application and would extend the capabilities of MS 800 by providing for information or software downloads to MS 800 other than through a wireless communication network. The alternate download path may for example be used to load an encryption key onto the device through a direct and thus reliable and trusted connection to thereby enable secure device communication.

Other communications subsystems 840, such as a short-range communications subsystem, is a further optional component which may provide for communication between MS 800 and different systems or devices, which need not necessarily be similar devices. For example, the subsystem 840 may include an infrared device and associated circuits and components or a Bluetooth™ communication module to provide for communication with similarly enabled systems and devices.

Relevant portions of exemplary standards documents are provided for in Appendix A below.

Final Comments. Thus, methods and apparatus for providing consistency in Short Message Service (SMS) timestamp formatting (UTC or non-UTC) for mobile communication devices are disclosed. In one illustrative example, a method involves receiving an SMS message intended for a mobile communication device; identifying whether the SMS message has timestamp data formatted in Coordinated Universal Time (UTC) format or non-UTC format; converting the timestamp data from the UTC format to a non-UTC time format based on an identification that the SMS message has timestamp data formatted in the UTC format; failing to convert the timestamp data to a non-UTC time format based on an identification that the SMS message has timestamp data in the non-UTC format; and causing the SMS message to be sent to the mobile communication device. Other techniques involve mobile device usage of a removable user identity module (R-UIM) which has a stored indicator in memory which is indicative of a timestamp mode of operation of a home message center as one of a coordinated universal time (UTC) mode and a non-UTC mode. A mobile station (MS) includes the removable user identity module in its mobile equipment (ME) which includes an R-UIM interface which interfaces with the R-UIM; a processor; and a visual display coupled to the processor. The processor of the ME is operative to receive a Short Message Service (SMS) message having timestamp data; convert the timestamp data from a Coordinated Universal Time (UTC) format to a non-UTC format when the stored indicator in the R-UIM indicates that the timestamp data has the UTC format; and cause the visual display to display the timestamp. The stored indicator may be a dedicated timestamp mode indicator or, alternatively, an identification of a service provider that is associated with a particular timestamp mode of operation, for example.

Even another technique of providing consistency in Short Message Service (SMS) message timestamp formatting for mobile communication devices comprises receiving, at a first message center, an SMS message having subparameters, at least one of the subparameters including a timestamp; and converting the timestamp of the subparameter from a first timestamp format to a second timestamp format. The first timestamp format may be Coordinated Universal Time (UTC) and the second timestamp format may be non-UTC, or vice versa. The SMS message may be sent from a mobile station or a second message center.

The above-described, and here-to appended, embodiments of the present application are intended to be examples only. Those of skill in the art may effect alterations, modifications and variations to the particular embodiments without departing from the scope of the application.

Appendix A 4.5.4 Message Center Time Stamp

The Message Center Time Stamp subparameter may be included with SMS messages sent from a Message Center. The Message Center Time Stamp subparameter has the following fixed-length format:

| Field | Length (bits) |
| --- | --- |
| SUBPARAMETER_ID | 8 |
| SUBPARAM_LEN | 8 |
| YEAR | 8 |
| MONTH | 8 |
| DAY | 8 |
| HOURS | 8 |
| MINUTES | 8 |
| SECONDS | 8 |
| OFFSET_SIGN | 1 |
| UTC_TIME_OFFSET | 6 |
| RESERVED | 1 |

Note: all date and time fields contain two 4-bit BCD numbers giving the decimal value of the field. For example, if the year is 1996, the YEAR field contains '10010110'.

| | |
| --- | --- |
| SUBPARAMETER_ID | Subparameter identifier.<br>This field shall be set to '00000011'. |
| SUBPARAM_LEN | Subparameter length.<br>This field shall be set to '00000111'. |
| YEAR | Current year.<br>This field shall be set to the current year, in the range 00-99. |
| MONTH | Current month.<br>This field shall be set to the current month, in the range 1-12. |
| DAY | Current day of month.<br>This field shall be set to the current day of the month. |
| HOURS | Current hour.<br>This field shall be set to the current hour, in the range 0-23. |
| MINUTES | Current minutes.<br>This field shall be set to the current minutes, in the range 0-59. |

| Field | | |
|---|---|---|
| SECONDS | Current seconds. This field shall be set to the current seconds, in the range 0-59. | |
| OFFSET_SIGN | Offset sign. If the time stamp given by the DAY, HOURS, MINUTES, and SECONDS fields represents a UTC time, this field shall be set to '0'. If the time stamp given by the DAY, HOURS, MINUTES, and SECONDS fields does not represent a UTC time, this field shall be set as follows: This field shall be set to '0' if UTC time can be determined by adding the offset in the UTC_TIME_OFFSET field to the time given by the DAY, HOURS, MINUTES, and SECONDS fields. This field shall be set to '1' if UTC time can be determined by subtracting the offset in the UTC_TIME_OFFSET field to the time given by the DAY, HOURS, MINUTES, and SECONDS fields. | |
| UTC_TIME_OFFSET | UTC time offset. If the time stamp given by the DAY, HOURS, MINUTES, and SECONDS fields represents a UTC time, this field shall be set to '000000'. If the time stamp given by the DAY, HOURS, MINUTES, and SECONDS fields does not represent a UTC time, this field shall be set as follows: This field shall be set to the difference in units of quarter hours between the time given by the DAY, HOURS, MINUTES, and SECONDS fields and the UTC time. | |
| RESERVED | Reserved. This field shall be set to '0'. | |

4.5.5 Validity Period—Absolute

The Validity Period—Absolute subparameter indicates to the message center the message expiration time, after which the message should be discarded if not delivered to the destination.

The Validity Period—Absolute subparameter has the following fixed-length format:

| Field | Length (bits) |
|---|---|
| SUBPARAMETER_ID | 8 |
| SUBPARAM_LEN | 8 |
| YEAR | 8 |
| MONTH | 8 |
| DAY | 8 |
| HOURS | 8 |
| MINUTES | 8 |
| SECONDS | 8 |
| OFFSET_SIGN | 1 |
| UTC_TIME_OFFSET | 6 |
| RESERVED | 1 |

Note: all date and time fields contain two 4-bit BCD numbers giving the decimal value of the field. For example, if the year is 1996, the YEAR field contains '10010110'.

| Field | | |
|---|---|---|
| SUBPARAMETER_ID | Subparameter identifier. This field shall be set to '00000100'. | |
| SUBPARAM_LEN | Subparameter length. This field shall be set to '00000111'. | |
| YEAR | Expiration year. This field shall be set to the expiration year, in the range 00-99. | |
| MONTH | Expiration month. This field shall be set to the expiration month, in the range 1-12. | |
| DAY | Expiration day of month. This field shall be set to the expiration day of the month. | |
| HOURS | Expiration hour. This field shall be set to the expiration hour, in the range 0-23. | |
| MINUTES | Expiration minutes. This field shall be set to the expiration minutes, in the range 0-59. | |
| SECONDS | Expiration seconds. This field shall be set to the expiration seconds, in the range 0-59. | |
| OFFSET_SIGN | Offset sign. If the time stamp given by the DAY, HOURS, MINUTES, and SECONDS fields represents a UTC time, this field shall be set to '0'. If the time stamp given by the DAY, HOURS, MINUTES, and SECONDS fields does not represent a UTC time, this field shall be set as follows: This field shall be set to '0' if UTC time can be determined by adding the offset in the UTC_TIME_OFFSET field to the time given by the DAY, HOURS, MINUTES, and SECONDS fields. This field shall be set to '1' if UTC time can be determined by subtracting the offset in the UTC_TIME_OFFSET field to the time given by the DAY, HOURS, MINUTES, and SECONDS fields. | |
| UTC_TIME_OFFSET | UTC time offset. If the time stamp given by the DAY, HOURS, MINUTES, and SECONDS fields represents a UTC time, this field shall be set to '000000'. If the time stamp given by the DAY, HOURS, MINUTES, and SECONDS fields does not represent a UTC time, this field shall be set as follows: This field shall be set to the difference in units of quarter hours between the time given by the DAY, HOURS, MINUTES, and SECONDS fields and the UTC time. | |
| RESERVED | Reserved. This field shall be set to '0'. | |

When performing computations with the value of the field YEAR, the value should be converted to the full year in the range 1996-2095 by adding 1900 if the value is between 96 and 99 inclusive or by adding 2000 if the value is between 00 and 95 inclusive; e.g., 99 should be converted to 1999 and 00 to 2000.

Deferred Delivery Time—Absolute

The Deferred Delivery Time—Absolute subparameter indicates the absolute time of delivery desired by the originator.

The Deferred Delivery Time—Absolute subparameter has the following fixed-length format:

| Field | Length (bits) |
|---|---|
| SUBPARAMETER_ID | 8 |
| SUBPARAM_LEN | 8 |
| YEAR | 8 |
| MONTH | 8 |
| DAY | 8 |
| HOURS | 8 |
| MINUTES | 8 |
| SECONDS | 8 |
| OFFSET_SIGN | 1 |

-continued

| | |
|---|---|
| UTC_TIME_OFFSET | 6 |
| RESERVED | 1 |

Note: all date and time fields contain two 4-bit BCD numbers giving the decimal value of the field. For example, if the year is 1996, the YEAR field contains '10010110'.

| | |
|---|---|
| SUBPARAMETER_ID | Subparameter identifier.<br>This field shall be set to '00000110'. |
| SUBPARAM_LEN | Subparameter length.<br>This field shall be set to '00000111'. |
| YEAR | Delivery year (UTC).<br>This field shall be set to the delivery year (UTC), in the range 00-99. |
| MONTH | Delivery month (UTC).<br>This field shall be set to the delivery month (UTC), in the range 1-12. |
| DAY | Delivery day of month (UTC).<br>This field shall be set to the delivery day of the month (UTC). |
| HOURS | Delivery hour (UTC).<br>This field shall be set to the delivery hour (UTC), in the range 0-23. |
| MINUTES | Delivery minutes (UTC).<br>This field shall be set to the delivery minutes (UTC), in the range 0-59. |
| SECONDS | Current seconds (UTC).<br>This field shall be set to the delivery seconds (UTC), in the range 0-59. |
| OFFSET_SIGN | Offset sign.<br>If the time stamp given by the DAY, HOURS, MINUTES, and SECONDS fields represents a UTC time, this field shall be set to '0'. If the time stamp given by the DAY, HOURS, MINUTES, and SECONDS fields does not represent a UTC time, this field shall be set as follows:<br>This field shall be set to '0' if UTC time can be determined by adding the offset in the UTC_TIME_OFFSET field to the time given by the DAY, HOURS, MINUTES, and SECONDS fields. This field shall be set to '1' if UTC time can be determined by subtracting the offset in the UTC_TIME_OFFSET field to the time given by the DAY, HOURS, MINUTES, and SECONDS fields. |
| UTC_TIME_OFFSET | UTC time offset.<br>If the time stamp given by the DAY, HOURS, MINUTES, and SECONDS fields represents a UTC time, this field shall be set to '000000'.<br>If the time stamp given by the DAY, HOURS, MINUTES, and SECONDS fields does not represent a UTC time, this field shall be set as follows:<br>This field shall be set to the difference in units of quarter hours between the time given by the DAY, HOURS, MINUTES, and SECONDS fields and the UTC time. |
| RESERVED | Reserved.<br>This field shall be set to '0'. |

When performing computations with the value of the field YEAR, the value should be converted to the full year in the range 1996-2095 by adding 1900 if the value is between 96 and 99 inclusive or by adding 2000 if the value is between 00 and 95 inclusive; e.g., 99 should be converted to 1999 and 00 to 2000.

The invention claimed is:

1. In a terminating message center, a method of providing consistency in Short Message Service (SMS) time stamp formatting for mobile communication devices, the method comprising:

receiving, at the terminating message center and from an originating message center, an SMS message to be delivered to a mobile communication device, the SMS message containing an originating message center time stamp added by the originating message center, the originating message center time stamp being formatted using a time stamp mode of the originating message center;

converting, at the terminating message center, the originating message center time stamp from a Coordinated Universal Time (UTC) format to a non-UTC time format using a home time zone of the terminating message center when the originating message center time stamp is in UTC format, thereby creating a converted message center time stamp; and causing the SMS message having the converted message center time stamp to be sent to the mobile communication device.

2. The method of claim 1, further comprising:
determining the time stamp mode based on an identification of the originating message center.

3. The method of claim 1, further comprising:
determining the time stamp mode based on an address of an originating mobile communication device which originated the SMS message.

4. The method of claim 1, wherein the terminating message center comprises a terminating Short Message Service Center.

5. The method of claim 1, further comprising:
determining the time stamp mode based on an indication in the SMS message.

6. The method of claim 1, further comprising:
refraining from converting the originating message center time stamp to the non-UTC time format when the originating message center time stamp is in non-UTC format.

7. The method of claim 1, further comprising:
translating, at the terminating message center, the originating message center time stamp from a home time zone of the originating message center to the home time zone of the terminating message center if the time stamp mode is non-UTC.

8. The method of claim 1, wherein the time stamp mode of UTC specifies that message center time stamps of SMS messages from the originating message center are set to UTC time regardless of a home time zone associated with an originating mobile communication device that originates the SMS messages.

9. A method of providing consistency in Short Message Service (SMS) message timestamp formatting for mobile communication devices, the method comprising the acts of:

receiving, at a first message center, a first SMS message addressed to a first mobile communication device from a second message center, the first SMS message containing a first message center time stamp provided by the second message center;

modifying the first SMS message at the first message center to convert the first message center time stamp of the first SMS message from a Coordinated Universal Time (UTC) format to a non-UTC format using a home time zone associated with the first mobile communication device when the first message center time stamp is in UTC format;

receiving, at the first message center, a second SMS message to be transmitted to a second mobile communication device via the second message center;

modifying the second SMS message at the first message center to provide a second message center time stamp in the second SMS message in the UTC format; and transmitting the second SMS message to the second message center.

10. The method of claim 9, wherein the first message center operates in a non-UTC time stamp mode.

11. The method of claim 9, wherein each said first and second SMS message comprises an SMS Teleservice layer message in accordance with 3GPP2.

12. The method of claim 9, wherein the first message center is a home message center of the first mobile communication device.

13. The method of claim 9, wherein wherein the first message center comprises a Short Message Service Center.

14. A message center which is operative to provide consistency in Short Message Service (SMS) message timestamp formatting for mobile communication devices by receiving, at the message center, a first SMS message addressed to a first mobile communication device, from another message center, the first SMS message containing a first message center time stamp provided by the other message center; modifying the first SMS message at the message center to convert the first message center time stamp of the first SMS message from a Coordinated Universal Time (UTC) format to a non-UTC format using a home time zone associated with the first mobile communication device when the first message center time stamp is in UTC format; receiving, at the message center, a second SMS message to be transmitted to a second mobile communication device via the other message center; modifying the second SMS message at the message center to provide a second message center time stamp in the second SMS message in the UTC format; and transmitting the second SMS message to the other message center.

15. The message center of claim 14, wherein the message center operates in a non-UTC time stamp mode.

16. The message center of claim 14, wherein each said first and second SMS message comprises an SMS Teleservice layer message in accordance with 3GPP2.

17. The message center of claim 14, which is the home message center of the first mobile communication device.

18. The message center of claim 14, which comprises a Short Message Service Center.

19. In a terminating Short Message Service (SMS) Message Center (SMS-MC), a method of providing consistency in SMS time stamp formatting for mobile communication devices, the method comprising:

receiving, at the terminating SMS-MC and from an originating SMS-MC, an SMS message to be delivered to a mobile communication device, the SMS message containing an originating message center time stamp added by the originating SMS-MC, the originating message center time stamp being formatted using a time stamp mode of the originating SMS-MC;

converting, at the terminating SMS-MC, the originating message center time stamp from a Coordinated Universal Time (UTC) format to a non-UTC time format using a home time zone of the terminating SMS-MC when the originating message center time stamp is in UTC format, thereby creating a converted message center time stamp; and causing the SMS message having the converted message center time stamp to be sent to the mobile communication device.

20. A method of providing consistency in Short Message Service (SMS) message timestamp formatting for mobile communication devices, the method comprising:

receiving, at a terminating message center, a first SMS message to be sent to a first mobile communication device from a second mobile communication device through an originating message center, the first SMS message containing an originating message center timestamp provided by the originating message center;

modifying the first SMS message at the terminating message center to convert the originating message center time stamp of the first SMS message from a Coordinated Universal Time (UTC) format to a non-UTC format using a home time zone associated with the first mobile communication device; and for a second SMS message to be sent from the first mobile communication device to the second mobile communication device through the originating message center: modifying the second SMS message at the terminating message center to provide a terminating message center time stamp in the second SMS message in the UTC format.

21. The method of claim 20, wherein the terminating message center operates in a non-UTC time stamp mode.

22. The method of claim 20, wherein the first and the second SMS messages are SMS Teleservice layer messages in accordance with 3GPP2.

23. The method of claim 20, wherein the UTC format is independent of a local time in a home time zone of the second mobile communication device.

* * * * *